US009458959B2

(12) United States Patent
Mammen et al.

(10) Patent No.: US 9,458,959 B2
(45) Date of Patent: Oct. 4, 2016

(54) COUPLING ASSEMBLY

(71) Applicant: Fiskars Oyj Abp, Helsinki (FI)

(72) Inventors: Chad James Mammen, Washington, IL (US); Lawrence P. Heren, East Peoria, IL (US)

(73) Assignee: Fiskars Oyj Abp, Helsinki (FI)

( * ) Notice: Subject to any disclaimer, the term of this patent is extended or adjusted under 35 U.S.C. 154(b) by 672 days.

(21) Appl. No.: 13/656,127

(22) Filed: Oct. 19, 2012

(65) Prior Publication Data

US 2014/0109987 A1    Apr. 24, 2014

(51) Int. Cl.
*F16L 37/00* (2006.01)
*F16L 37/48* (2006.01)
*F16L 33/00* (2006.01)

(52) U.S. Cl.
CPC ............... *F16L 37/48* (2013.01); *F16L 33/00* (2013.01); *Y10T 137/598* (2015.04)

(58) Field of Classification Search
CPC ........... F16L 1/00; F16L 15/00; F16L 33/24; F16L 33/32; F16L 37/48; F16L 33/00
USPC .................. 285/392, 393, 257, 256
See application file for complete search history.

(56) References Cited

U.S. PATENT DOCUMENTS

| 2,696,995 | A | * | 12/1954 | Schacht | 285/392 |
| 3,930,619 | A | * | 1/1976 | Levey et al. | 239/526 |
| 4,465,097 | A | | 8/1984 | Suzuki et al. | |
| 4,776,517 | A | * | 10/1988 | Heren | 239/391 |
| 4,997,131 | A | * | 3/1991 | Heren | 239/397.5 |
| 5,246,254 | A | * | 9/1993 | LoJacono et al. | 285/16 |
| D475,768 | S | | 6/2003 | Walker | |
| D475,769 | S | | 6/2003 | Walker | |
| 6,659,373 | B1 | | 12/2003 | Heren et al. | |
| 6,691,937 | B2 | | 2/2004 | Heren et al. | |
| 6,796,515 | B2 | | 9/2004 | Heren et al. | |
| D706,126 | S | | 6/2014 | Orow | |
| 2002/0000720 | A1 | * | 1/2002 | Knowles | 285/308 |
| 2002/0074428 | A1 | * | 6/2002 | Djordjevic | 239/276 |
| 2002/0129861 | A1 | * | 9/2002 | Holdenried | 138/109 |
| 2005/0099008 | A1 | * | 5/2005 | Glover | 285/357 |
| 2007/0080242 | A1 | * | 4/2007 | Wang et al. | 239/526 |
| 2013/0140382 | A1 | * | 6/2013 | Eley et al. | 239/526 |
| 2014/0338178 | A1 | | 11/2014 | Lehmann et al. | |

FOREIGN PATENT DOCUMENTS

DE    19937332 A1 *    3/2001    ........... F16L 19/062

* cited by examiner

*Primary Examiner* — David E Bochna
*Assistant Examiner* — James Linford
(74) *Attorney, Agent, or Firm* — Foley & Lardner LLP

(57) ABSTRACT

A coupling assembly includes a mechanical attachment to accommodate various diameter fluid passages and resists rotational forces of attaching and detaching a hose from the hose coupler. The mechanical attachment includes a shank having a shoulder defining a space with a conduit of the hose coupling assembly or with a spacer disposed in the conduit. A threaded coupler includes a projecting portion disposed adjacent to the shoulder. The threaded coupler includes a key, or a recess to mate with a key, to substantially prevent rotation of the threaded coupler with respect to the hose coupler.

4 Claims, 5 Drawing Sheets

COUPLING ASSEMBLY

FIELD

The present invention relates to coupling assemblies, and more particularly to a mechanical attachment of a hose coupling to accommodate various diameter fluid passages and to resist the rotational energy of attaching and detaching a hose from the coupling.

BACKGROUND

Hose couplings are used in variety of industries and applications to couple a supply of fluid, such as water, fuel, oil, food, solution, and beverages, to a delivery device, such as a nozzle, a sprayer, a sprinkler, a wand, or to a storage device or vessel. Hose couplings capable of coupling a water supply to a water hose or coupling a water hose to a water nozzle or sprayer are well known. Hose couplings can also be used in hose extensions, multiple-way connectors, such as two way connectors, water timers, water meters, water pumps, and when connecting one hose to another hose.

Hose couplings are often used to couple a garden hose to a spray nozzle or to a water sprinkler. These hose couplings can be located within a housing, such as a pistol grip of a garden spray nozzle or within a housing of an oscillating water sprinkler, a whirling water sprinkler or other water delivery devices or systems. In most of these applications, the hose coupling has a standard diametric size, which mates with a mating hose coupling attached to a hose. Because the hose couplings are of a standard diameter, the size of the water passage, which either delivers water to or delivers water away from the hose coupling, can constrain the number of design options for the hose coupling. Cost and functional requirements, however, can also limit the sizes available when designing the water passages.

Environmental usage of a product incorporating a hose coupling can dictate that the hose coupling be made from a different material than the water passage, thus making attachment of the hose coupling to the water passage a challenge. Rotational forces resulting from attaching and detaching a hose also need to be addressed in a manner that does not negatively affect the water passage or negatively affect the hose coupling.

Generally a hose terminates in a male fitting which threadingly engages a female fitting disposed in the housing of the water delivery device or storage device. In many instances, the male fitting which terminates the end of the hose is made of a metal while the female fitting can be made of a plastic material. Because of the dissimilarity of materials, engagement and disengagement of the male fitting from the female fitting over time can reduce the effectiveness of the connection of the female fitting to the housing and can even completely disengage the female fitting from the housing. Even when the male fitting is made of plastic, disengagement and engagement of one fitting with the other over time, can weaken a connection between the female fitting and the hose coupling and in particular the water passage. Furthermore if the interior surface of the water passage and the exterior surface of the female fitting have mating surfaces engaged with a friction fit or an interference fit, continued use over time can dislodge the female fitting from the water passage. Likewise, spot welding of the water passage to the female fitting is not always permanent. In most cases, any damage or reduced effectiveness of the hose coupling cannot be repaired, or should not be repaired due to the expense involved. Consequently, the only option can be to purchase a new device, although the device is otherwise still functional except for the damage to the hose coupling. This can be particularly evident in spray nozzles where the spay head or nozzle head is still functional, but the hose coupling leaks.

What is needed therefore is a hose coupling which can accommodate a variety of sizes of water passages and which can be used continuously through multiple engagements and disengagements of a hose without the need for repair or replacement.

SUMMARY

In accordance with one embodiment of the present disclosure, there is provided a fluid delivery device including a housing and an outflow member. The outflow member is disposed at a first end of the housing and is configured to dispense fluid. A conduit is located within the housing and defines a channel through the housing. The conduit defines an axial centerline. A shank is disposed within the channel. The shank includes a first portion and a second portion, wherein a transition from the first portion to the second portion defines a shank shoulder. A coupler, located at a second end of the housing, includes a threaded portion and a projecting portion extending toward the axial centerline of the channel, wherein the projecting portion is disposed adjacent to the shoulder of the shank. The fluid delivery device may be a nozzle, a sprayer, a sprinkler, a wand, a tank, or a storage device or vessel. The outflow member in fluid communication with the channel of the conduit can be a spray head, an oscillating tube, a spout, or other device capable of dispensing fluid.

In another embodiment, a coupling assembly includes a conduit defining a fluid channel having an upstream opening, a downstream opening, and an axial centerline, wherein a fluid moves from the upstream opening and exits through the downstream opening. A shank includes a shank shoulder wherein the shank is disposed within the channel. A coupler, located at the upstream opening, includes a threaded portion and a projecting portion extending toward the axial centerline, wherein the projecting portion is disposed adjacent to the shoulder of the shank. The coupling assembly may be a hose coupling assembly.

DESCRIPTION

Figure 1:
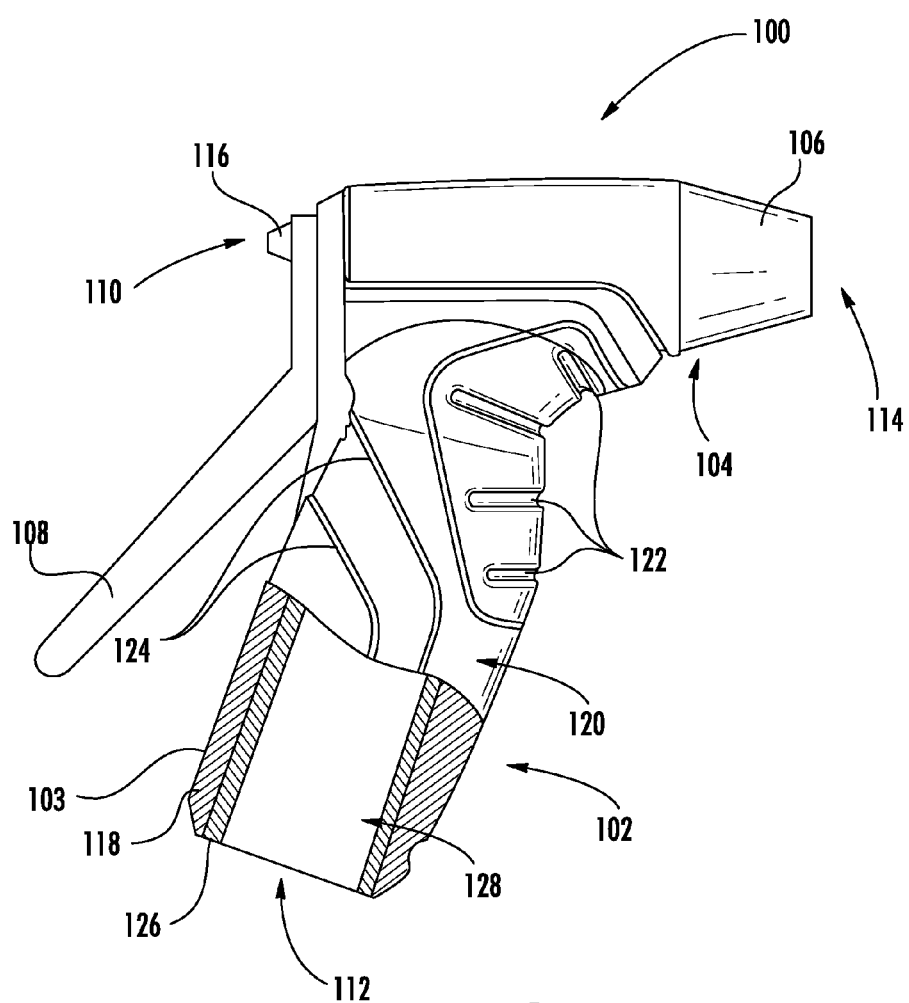
FIG. 1 is a plan view of a spray nozzle assembly including a sectional view of a portion of the handle of the spray nozzle assembly.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

FIG. 1 is a plan view of a spray nozzle assembly 100. The spray nozzle assembly is one example of a fluid delivery device. It will be understood that other types of fluid delivery devices are possible. For example, the fluid delivery device may be a sprayer, a sprinkler, a wand, a tank, or a storage device or vessel. The outflow member in fluid communication with the channel of the conduit can be a spray head, an oscillating tube, a spout, or other device capable of dispensing fluid. The spray nozzle assembly 100 includes a housing generally defining a head 104 and a handle 102. The head 104 includes a spray nozzle or spray head 106 terminating a first end of the head 104. A trigger 108 and a spray adjusting mechanism 110 are operatively coupled to a second end of the head 104. The trigger 108 controls the flow of fluid through the body of the assembly 100 from an upstream opening 112 and out through a downstream opening 114. The trigger 108 can be adjusted to control the flow of fluid from no flow, to reduced flow and to a maximum flow determined by the configuration of the spray nozzle assembly 100 and the components thereof. As illustrated, the trigger 108 is a rear trigger. In another example, the trigger can be a front trigger and can be located at the front portion of the spray nozzle assembly. In yet another example, the spray nozzle assembly can include a click or on/off push button formed on any portion of the body 118. Further yet another example, the spray nozzle assembly can be a twist spray nozzle or on/off touch spray nozzle, for example. The spray adjusting mechanism 110 can be adjusted, typically by rotating the mechanism about a rotational axis, to move a knob 116 of the spray adjusting mechanism closer to or further away from the spray nozzle 106. The spacing of the knob 116 from the body of the assembly controls the maximum amount of flow capable of being delivered by the spray nozzle 106 when the handle 108 is fully depressed.

The spray nozzle 106 can also be rotated about a rotational axis to adjust the amount of fluid and the configuration of the type of spray being delivered. The spray nozzle 106 can include a plurality of settings which can include for instance jet, mist, cone, soaker, vertical, flat and shower.

The spray nozzle assembly 100 includes a body 118, a sectional portion of which can be seen at a bottom portion of the handle 102. The body 118 can be made of relatively rigid material, such as plastic, which retains its shape when being subjected to an impact or other potentially damaging effects. The body 118 can be covered with an optional flexible cover or sleeve 120 typically formed of a compressible material, such as rubber, to provide comfort or a slip-free surface to a user. Other materials are also possible. The cover 120 can include depressions 122 and/or projections 124 to provide a relatively secure and slip-free surface, especially when wet. The cover 120 can be in the form of a sleeve which in which the body 118 is inserted or can be spray-coated on the body 118. The cover 120 can also include materials which are less susceptible to being slippery when wet, such as rubber mixed with other materials to form a roughened surface.

In one embodiment as illustrated in FIG. 1, a conduit 126 can be disposed in a cavity formed in the body 118. The conduit 126 can extend from the upstream opening 112 and up to the spray nozzle 106 to direct the flow of fluid through a channel 128 defined within the conduit 126. The conduit 126 can be formed of a material which is dissimilar than the material forming the body 118. The material of the conduit 126 can be selected according to the material's resistivity to the flow of water or fluid as well as material's effect on the quality or the physical, chemical, or biological character of the water or fluid passing therethrough. Other material characteristics of the conduit 126 can include material flexibility as well as a material's ability to retain adhesives or to support and retain plastic welds as described below. While the conduit 126 is illustrated as extending to the end of the body 118, the conduit 126 can include a length which does not extend to the end of the body 118 as described below. The length of the conduit 126 can be selected such that the conduit 126 does not extend all the way to the downstream opening 114.

Figure 2:
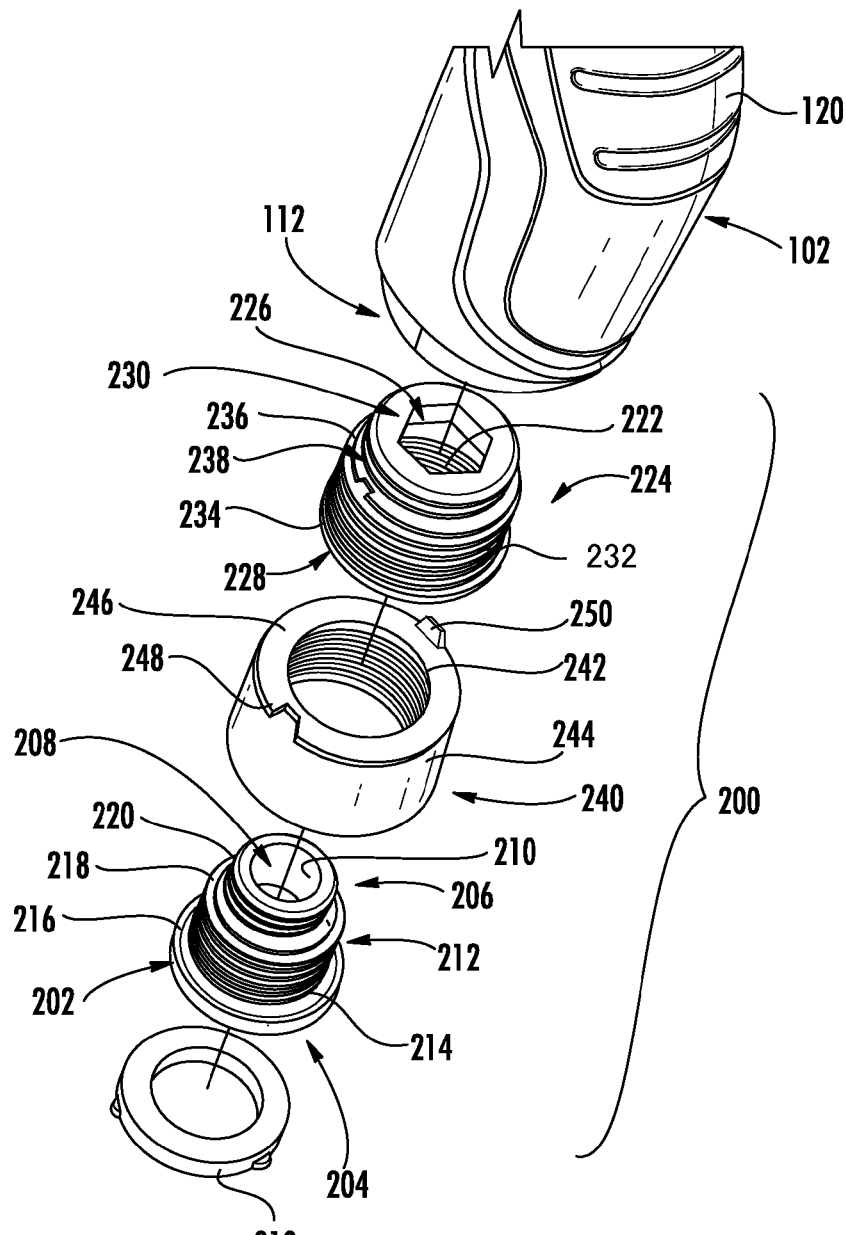
FIG. 2 is a partial perspective view a portion of the spay nozzle assembly and an exploded perspective view of one embodiment of a hose coupling assembly disposed in the handle of the spray nozzle assembly.

FIG. 2 is a partial perspective view of a portion of the spray nozzle assembly 100 and an exploded perspective view of one embodiment of a coupling assembly 200 disposed in the handle 102 of the spray nozzle assembly 100. The coupling assembly 200, for example a hose coupling assembly, can be located in the conduit 126 of the assembly 100. The hose coupling assembly 200 of FIG. 2 includes a mechanical attachment having a shank 202 generally defining a cylindrical structure having a first end 204, a second end 206, and a channel 208 coupling the first end 204 to the second end 206 to direct fluid therebetween. The channel 208 is defined by an interior surface 210, which in this embodiment is generally smooth. An exterior surface 212 includes a plurality of threads 214 which extend from a shoulder 216 to a portion of the shank 202 defining an annular or circumferential groove 218 configured to retain a gasket 220, such as an O-ring. The shoulder 216 is configured as a transition area of the outer surface of the shank 202 wherein a diameter of the portion defining the threads 214 is less than the diameter of the portion of the shank 202 defining the shoulder 216.

The threads 214 of the shank 202 engage a plurality of threads 222 disposed in an interior of a spacer 224 generally configured as a cylinder defining a channel 226 extending from a first end 228 to a second end 230. The spacer 224 also includes a plurality of threads 232 disposed on an exterior surface of the spacer 224. The threads extend from a shoulder 234 disposed toward the first end 228 to an intermediate portion of the exterior of the spacer 224. A circumferential or annular groove 236 provides a space for the location of a gasket 238, such as an O-ring.

As illustrated, a hose coupler 240 is disposed between the shank 202 and the spacer 224. During assembly, the spacer 224 is inserted into the conduit 126 and then the shank 202 is inserted into the hose coupler 240. The hose coupler 240 is generally cylindrical and includes a cylindrical wall having a plurality of threads 242 located in an interior space of the coupler 240. An exterior surface 244 of the wall is generally smooth, but can include other surface features such as ribs, projections, and recesses. A circumferential or annular projection portion 246 extends or projects toward the interior space of the coupler 240. The projection portion 246 can include a key 248 and a key 250 which mate with corresponding mating features of the conduit 126 or spacer 224. In another embodiment, elements 248 and 250 can both be recesses or one of the elements 248 and 250 can be a key and the other element can be a recess. In such embodiments, the spacer 224 includes the appropriate key or recess to mate with the corresponding key or recess disposed on the coupler 240. In addition, a single key or a single recess can be disposed on one of the spacer 224 or coupler 240 or more than two keys or recess can be provided on the spacer 224 or coupler 240.

The shank 202 is inserted through the hose coupler 240 until the shoulder 216 contacts a surface of the projecting portion 246 configured to project toward the interior of the coupler 240 and generally toward an axial centerline of the conduit 126. The threads 214 of the shank 202 are threaded with the threads 222 of the spacer 224. The hose coupler 240 can then positioned within the conduit 126 such that the threads 242 of the hose coupler 240 are positioned to accept a male fitting of a hose as further illustrated in FIG. 3. It is also possible to insert the spacer 224 into the conduit 126, insert the coupler 240 into the cavity 128, and then thread the shank 202 to the spacer 224. Other methods of assembly can be used.

Figure 3:
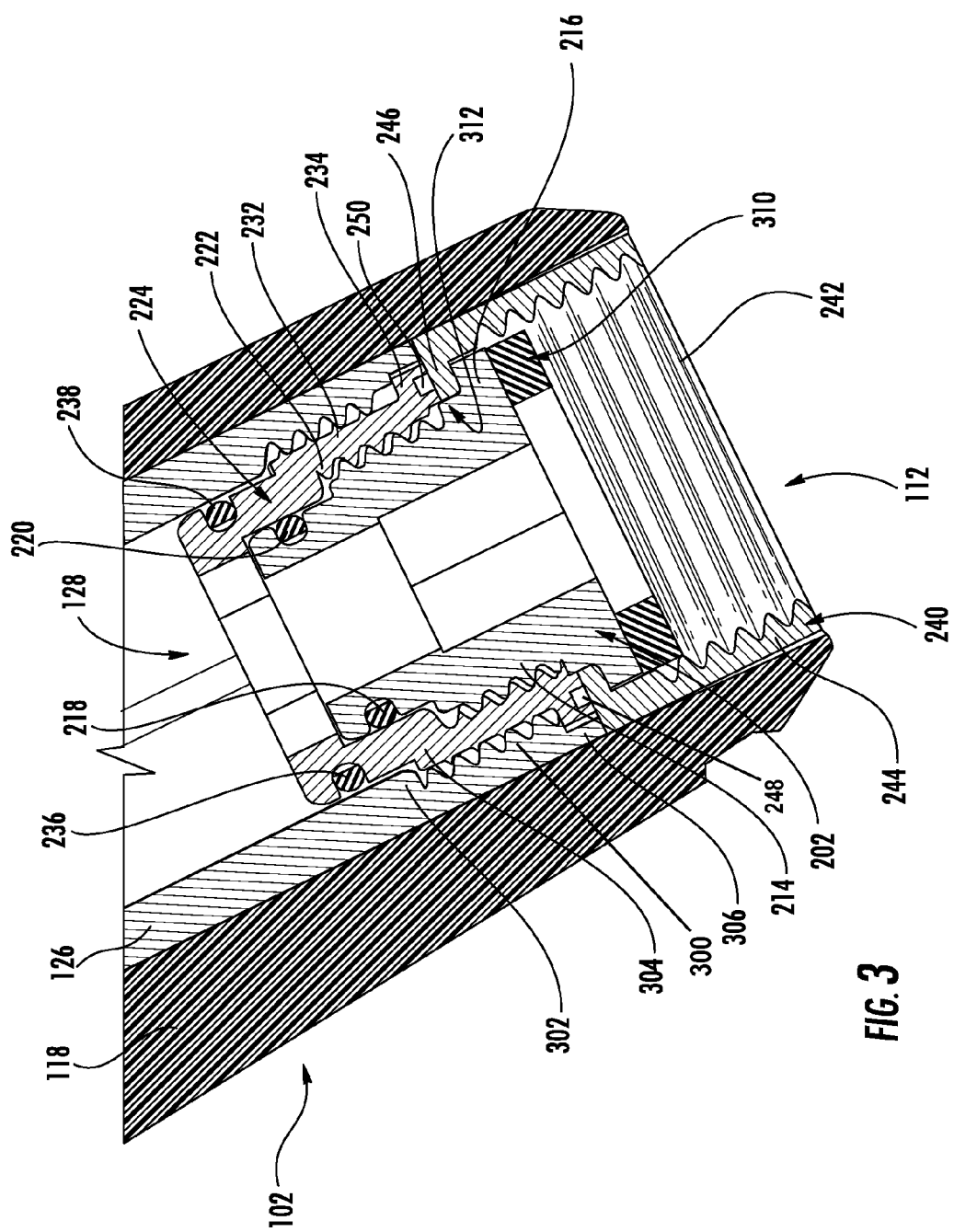
FIG. 3 is a partial sectional view of the embodiment of the hose coupling assembly of FIG. 2.

FIG. 3 is a partial sectional view of the embodiment of the hose coupling assembly 200 of FIG. 2 when coupled to the conduit 126. In this embodiment, the conduit 126 of the spray nozzle assembly 100 includes a plurality of threads 300 and does not extend to the end of the handle 102. The threads 300 are located toward the upstream opening 112, but do not extend all of the way to the end of the handle 102 so that the hose coupler 240 can be inserted into the channel 128. The threads 300 also do not extend past a shoulder 302 defined in the conduit 126.

To couple the hose coupling assembly 200 to the conduit 126, the spacer 224 is inserted into the channel 128 and the threads 232 are threadingly engaged with the threads 300 of the conduit 126. The shoulder 302 engages a shoulder 304 of the spacer 224 such that rotation of the spacer 224 is limited to the extent of the threads and fixes the location of the spacer 224 within the channel 128. The O-ring 238 contacts the inner wall of the conduit 126 to provide a substantially fluid tight seal with the spacer 224 and the conduit 126.

Once the spacer 224 is located against the shoulder 302 of the conduit 126, the hose coupler 240 can be inserted into the channel 128 until the hose coupler 240 contacts an end portion 306 of the conduit 126. The end portion 306 limits the extent to which the hose coupler 240 can be inserted into the channel 128. By locating the end portion 306 at a predetermined location, the position of the hose coupler 240 can be fixed with respect to the upstream opening 112 such that the threads 242 of the hose coupler 240 can be properly located for connection to and access by a male fitting of a hose.

The smooth external surface 244 of the hose coupler 240 enables a relatively unrestricted insertion of the coupler 240 into the handle 102, excluding friction between the handle 102 and the coupler 240. The outer diameter of the hose coupler 240 can also be slightly larger than the inner diameter of the body 118 to ensure a snug fit. The key 250 of the hose coupler 240 engages a recess located in the conduit 126 to substantially prevent rotation of the hose coupler 240 with respect to the conduit 126 once the hose coupler 240 is properly located. While a key 250 is illustrated as being located on the hose coupler 240, the conduit 126 can include keys which engage recesses in the hose coupler 240. Each of the hose coupler 240 and the conduit 126 can include both keys and recesses to engage the other. In addition, one of the coupler 240 and the conduit 126 can include two or more recesses and the other can include two keys to thereby reduce the difficulty of engaging the hose coupler 240 to the conduit 126. While the hose coupler 240 is illustrated as having a smooth external surface 244, the external surface 244 can include ridges, projections, depressions, or other features which can mate with corresponding features of the handle 102 or with the conduit 126 if the conduit 126 extends sufficiently toward the end of the handle to mate with the coupler 240.

After the hose coupler 240 is seated at the predetermined location, the shank 202 is inserting through an aperture of the coupler 240 to engage the shank threads 214 to the spacer threads 222. The threads of one are rotated with respect to the threads of the other until the shoulder 216 meets the projecting portion 246 of the hose coupler 240. The O-ring 220 engages an inner surface of the spacer 224 to provide a substantially waterproof engagement of the shank 202 to the spacer 224. Once the shank 202 has been sufficiently seated against the coupler 240, a washer 310, o-ring, or other sealing device can be inserted at the open end of the handle 102 to provide for a seal between the hose coupler 240 and a male fitting of a hose. The shoulder 234 of the spacer 224 and the shoulder 216 of the shank 202 define a cavity 312 in which the portion 246 is located. This cavity 312, which is an annular cavity in the illustrated embodiment, captures the projection portion 246 and not only provides a location for the projection portion 246, but also enables the shoulder 216 to hold the projection portion 246 against the shoulder 234 of the spacer 224. While the cavity 312 is illustrated as being annular, other types of cavities can be used. For instance, if the conduit 126 does not define a channel having a substantially circular cross-section, the cavity 312 would include a shape defined by the interior walls of the channel. Consequently, the cavity 312 can include a number of shapes including oval, rectangular, elliptical, circumferential and others. By placing the projection portion 246 closer to the upstream opening of the spray nozzle when compared to the location of the shoulder 216 (which is closer to the downstream opening), forces tending to pull the coupler 240 toward the downstream opening can be overcome since the coupler 240 is being pulled against the shoulder 216 of the shank 202. In another embodiment, the spacer 224 can be eliminated and the threaded shank 202 can threadingly engage a threaded conduit 126.

Figure 4:
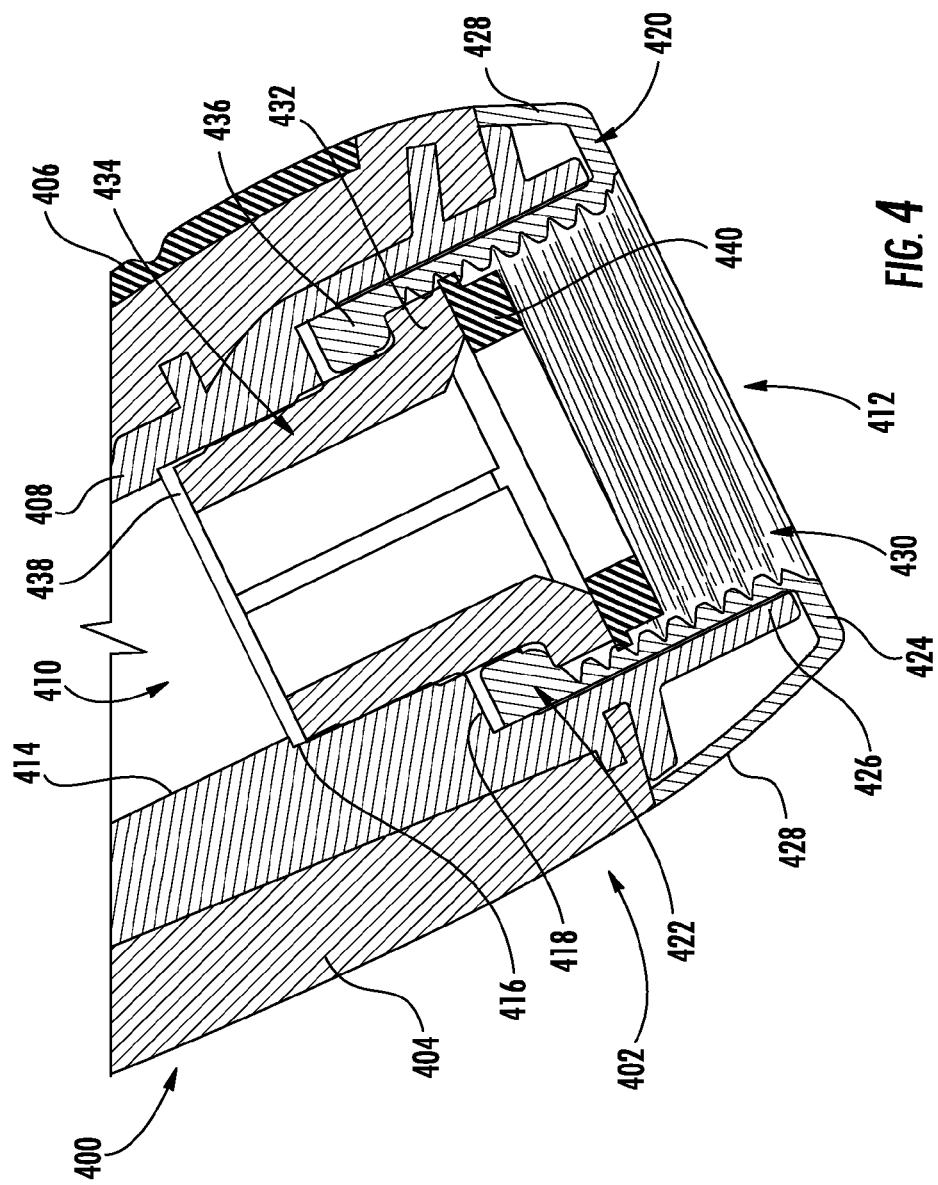
FIG. 4 is a partial sectional view of another embodiment of a hose coupling assembly disposed in a handle of a spray nozzle assembly.

FIG. 4 is a partial sectional view of another embodiment of a hose coupling assembly disposed in a handle of a spray nozzle assembly. In the illustrated embodiment, a spray nozzle assembly includes a housing 400 having an end portion 402. The housing 400 includes a body 404 at least partially covered with a flexible cover or coating 406 to improve gripping. A conduit 408 is disposed within the body 404 and defines a channel 410. The channel 410 extends in one direction towards an upstream opening 412 of the handle and in the other direction toward a downstream opening. In a spray nozzle assembly, the channel 410 directs fluid generally from the opening 412 to the downstream opening which can be operatively coupled to a spray nozzle.

The conduit 408 includes a generally smooth interior wall 414 which defines a first circumferential shoulder 416 and a second circumferential shoulder 418. The shoulder 416 is defined at a transition between a first portion of the conduit having an interior circumference and a second portion of the conduit having an interior circumference greater than the interior circumference of the first portion. The shoulder 418 is defined at a transition from the second portion of the conduit 408 to a third portion of the conduit 408 where the interior circumference of the third portion is greater than the interior circumference of the second portion.

A hose coupler 420 is inserted into the opening 412 until a projection portion 422 contacts the circumferential shoulder 418, a base portion 424 contacts an end portion 426 of the conduit 408, or both the projection portion 422 and the base portion 424 contact the respective portions of the conduits. While the hose coupler 420 can be fixedly coupled to the conduit 408 with an adhesive or by a weld, a side portion 428 of the hose coupler 420 also can be configured to engage mating features of the body 404 of the housing 400 to fix the location of the hose coupler 420 to the housing where adhesives or welds can be placed. Adhesives, welds, snap-on, and mating features, either alone or in combination can substantially prevent rotational movement of the hose coupler 420 within the housing 400 which can result from attachment or removal of a male fitting from a plurality of threads 430 of the hose coupler 420.

Once the hose coupler 420 is fixed to the housing 400, a threadless shank 434 is inserted through an aperture of the hose coupler 420 until a shoulder 432 of a shank 434 contacts a shoulder 436 of the hose coupler 420. The shoulder 436 of the hose coupler 420 is disposed between the threads 430 and the projection portion 422 of the hose coupler 420. An end portion 438 of the shank 434 can also be used to locate the shank 434 within the conduit 408 through contact with the circumferential shoulder 416. Once the shank 434 is appropriately positioned within the conduit 408, the location of the shank 434 can be fixed with adhesive, welding, or other means of attachment, including any combination of fixing methods described herein. Other fixing methods or devices can be used. After the shank 434 is fixed in position, a washer 440 can be located in the hose coupler 420 as previously described with respect to FIG. 3.

Figure 5:
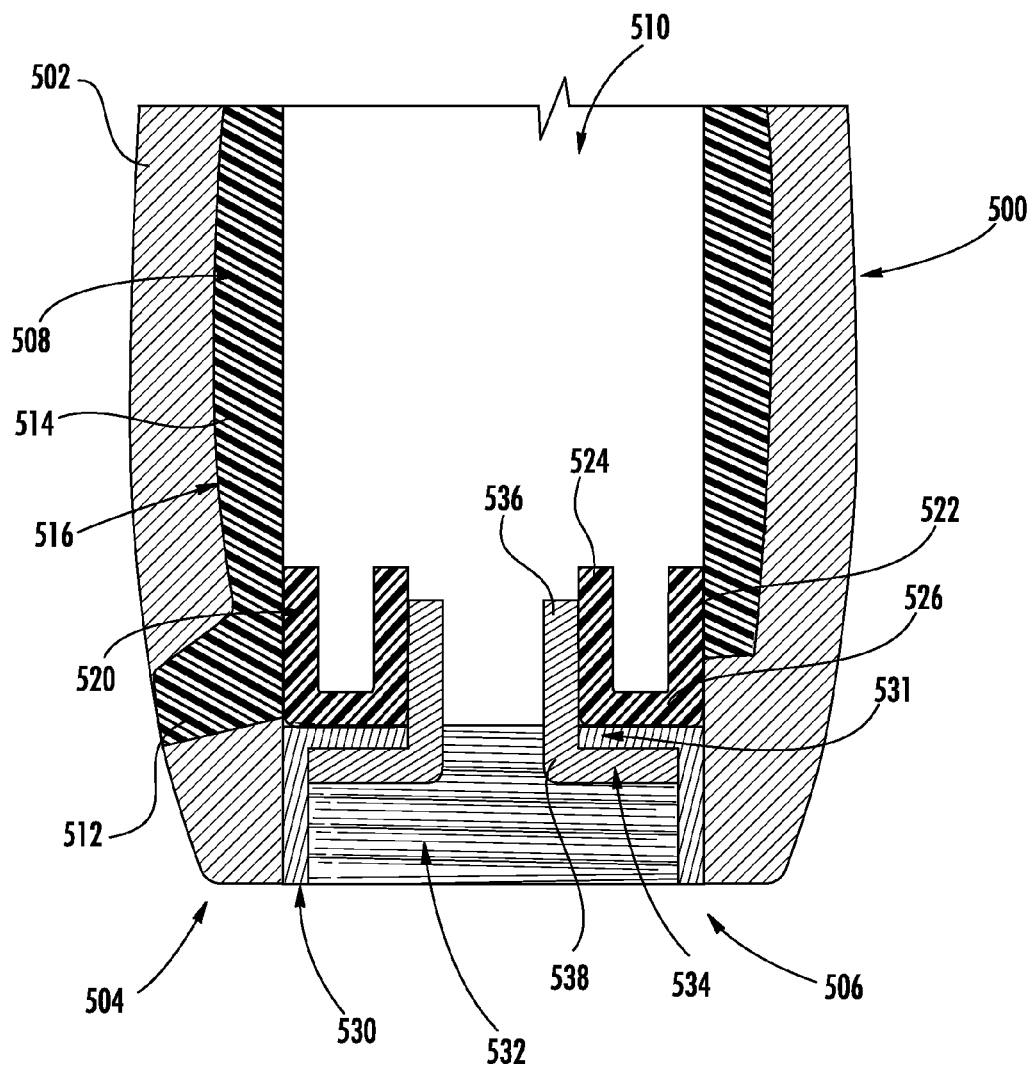
FIG. 5 is a partial sectional view of another embodiment of a hose coupling assembly disposed in a handle of a spray nozzle assembly.

FIG. 5 is a partial sectional view of another embodiment of a hose coupling assembly disposed in a handle portion 500 of a spray nozzle assembly. In the illustrated embodiment, the spray nozzle assembly includes the handle portion 500 having a body 502 terminating at an end portion 504 which includes an upstream opening 506. A conduit 508 is disposed within the handle portion 500 and defines a channel 510 through which fluid flows. The conduit 508 generally includes a plastic tube formed to fit within the handle and which extends to a downstream opening to deliver fluid to a spray nozzle.

As illustrated in FIG. 5, the conduit 508 includes a projection 512 which extends from a wall 514 of the conduit 508 and which fits within an aperture 516 of the body 502. The projection 512 functions as a locator to locate the conduit 508 at a predetermined location within the body 502. The predetermined location can include a location along the flow path of the fluid moving from the upstream opening 506 to the downstream opening as well as a radial location located with respect to an axial centerline of a flowpath of the water or fluid.

A spacer 520 is disposed within the channel 510 and contacts at least a portion of the conduit 508. The spacer 520 can be formed of a plastic material which defines a cylindrical member fitting within the channel 510. A first side wall 522 is coupled to a second side wall 524 by a bottom wall 526. The first side wall 522 contacts the surface of the wall 514 and is fixed to the wall 514 with an adhesive or with a weld to bond the plastic of the wall 514 to the plastic of the first sidewall 522. While the spacer 520 is shown as including two side walls coupled by a bottom wall, the spacer 520 can be formed as a solid member to eliminate a space between the first side wall and the second side wall. The spacer 520 can also be formed of first and second side walls coupled with a bottom wall and a top wall such that a space or hollow within the part is not exposed to water.

Once the spacer 520 is fixed at a predetermined location within the channel 510, a hose coupler 530 is located within the upstream opening 506 until a projection portion 531 of the coupler 530 abuts the bottom wall 526 of the spacer 520. The hose coupler 530 includes a plurality of threads 532 to threadingly engage the threads of a male fitting as previously described. Once properly located, a shank 534 is moved into contact with the projecting portion 531 to stabilize and hold the hose coupler 530 at the predetermined location. The shank 534 is generally cylindrical and includes a cylindrical upstanding wall 536 coupled to a base portion 538. The upstanding wall 536 contacts the spacer 520 and the base portion 538 extends toward the threads 532 of the coupler 530. The shank 534 is inserted into an interior space defined by the spacer 520, until the extending portion 538 contacts the projection portion 531. Once the shank 534 is properly located, the shank 534 and spacer 520 can be adhered or welded together with a weld, such as a plastic weld, to fix the coupler 530 to the body 502. Plastic welds can include but are not limited to heat sealing, hot gas welding, high frequency welding, laser welding and solvent welding.

In another alternative embodiment, the conduit and coupling assembly can be used in the food industry and chemical industries. In those instances the material forming the conduit can be selected for the particular application.

While the invention has been illustrated and described in detail in the drawings and foregoing description, the same should be considered as illustrative and not restrictive in character. For instance, threadless hose couplers can also be used in the hose coupling assembly. In addition, different hose coupling assemblies can be configured to mate with conduits of different sizes and configurations. For instance, cylindrical conduits can have interior diameters of different sizes and hose coupling assemblies can be configured to couple to diameters of different sizes. Likewise a conduit having a non-cylindrical cross-section taken substantially perpendicular to the fluid flow direction, such as rectangular, can also be accommodated While it is understood that only the certain embodiments have been presented, any and all changes, modifications and further applications that come within the spirit of the invention are desired to be protected.

What is claimed is:

1. A fluid delivery assembly comprising:
a housing;
an outflow member disposed at a first end of the housing, the outflow member being configured to dispense fluid;
a conduit located within the housing and defining a fluid channel through the housing, the conduit having an end portion positioned proximate a second end of the housing, wherein the conduit defines an axial centerline, wherein the conduit includes a first conduit cylindrical portion and a second conduit cylindrical portion, wherein a transition from the first conduit cylindrical portion to the second conduit cylindrical portion defines a conduit shoulder, and wherein the conduit includes threads;
a shank disposed within the fluid channel, the shank including a first portion and a second portion, wherein a transition from the first portion to the second portion defines a shank shoulder, and wherein the shank includes threads; and
a coupler located at the second end of the housing, the coupler including a threaded portion and a projecting portion extending toward the axial centerline of the fluid channel, wherein the projecting portion is disposed adjacent to the shoulder of the shank, wherein the projecting portion of the coupler is disposed within a cavity defined by the shoulder of the shank and one of the conduit and a spacer, and wherein the spacer includes threads;

wherein the end portion of the conduit abuts the coupler to fix an insertion amount of the coupler within the fluid channel;

wherein the housing further includes an upstream opening and a downstream opening wherein fluid is directed by the conduit from the upstream opening to exit through the downstream opening, and the projecting portion of the coupler is disposed closer to the downstream opening than the shoulder of the shank is to the downstream opening;

wherein the threads of the shank threadingly engage with the threads of the spacer; and wherein the threads of the spacer threadingly engage with the threads of the conduit.

2. The fluid delivery assembly of claim 1 wherein the coupler includes a mating feature configured to engage a mating feature of one of the shank, the spacer, and the conduit.

3. The fluid delivery assembly of claim 2 wherein the mating feature of the coupler includes one of a key and a recess and the mating feature of one of the shank, the spacer, and the conduit includes the other of the key and the recess.

4. A coupling assembly comprising:
a conduit defining a fluid channel having an upstream opening, a downstream opening, an axial centerline, and an end portion proximate the upstream opening, wherein fluid moves from the upstream opening and exits through the downstream opening;

a shank including a shank shoulder, the shank being disposed within the fluid channel, wherein the shank includes threads; and a coupler located at the upstream opening, the coupler including a threaded portion and a projecting portion extending toward the axial centerline, wherein the projecting portion is disposed adjacent to the shoulder of the shank, wherein the projecting portion is disposed within a circumferential cavity defined by the shoulder of the shank and one of the conduit and a spacer, wherein the spacer includes first threads and second threads, and wherein the projecting portion of the coupler is disposed closer to the downstream opening than the shoulder of the shank;

wherein the end portion of the conduit abuts the coupler to fix an insertion amount of the coupler within the fluid channel;

wherein the threads of the shank threadingly engage with the first threads of the spacer; and wherein the threads of the conduit threadingly engage with the second threads of the spacer.

* * * * *